(12) United States Patent
Magno

(10) Patent No.: US 12,453,577 B2
(45) Date of Patent: Oct. 28, 2025

(54) FLEXIBLE SCOPE WITH IMPROVED SUCTION

(71) Applicant: OLYMPUS MEDICAL SYSTEMS CORPORATION, Hachioji (JP)

(72) Inventor: Joey Magno, Dudley, MA (US)

(73) Assignee: OLYMPUS MEDICAL SYSTEMS CORPORATION, Hachioji Tokyo (JP)

( * ) Notice: Subject to any disclaimer, the term of this patent is extended or adjusted under 35 U.S.C. 154(b) by 302 days.

(21) Appl. No.: 17/938,540

(22) Filed: Oct. 6, 2022

(65) Prior Publication Data

US 2023/0132190 A1 Apr. 27, 2023

Related U.S. Application Data

(60) Provisional application No. 63/363,074, filed on Apr. 15, 2022, provisional application No. 63/262,875, filed on Oct. 21, 2021.

(51) Int. Cl.
*A61B 17/3207* (2006.01)
*A61B 17/00* (2006.01)

(52) U.S. Cl.
CPC ......... *A61B 17/320758* (2013.01); *A61B 2017/00398* (2013.01); *A61B 2017/00561* (2013.01); *A61B 2017/00818* (2013.01); *A61B 2217/005* (2013.01)

(58) Field of Classification Search
CPC .. A61B 17/320758; A61B 2017/00398; A61B 2017/00561; A61B 2017/0818; A61B 2017/005
See application file for complete search history.

(56) References Cited

U.S. PATENT DOCUMENTS

| | | | | |
|---|---|---|---|---|
| 5,569,284 | A | * | 10/1996 | Young .............. A61B 17/32002 606/180 |
| 8,475,483 | B2 | * | 7/2013 | Schmitz ......... A61B 17/320758 606/167 |
| 8,968,346 | B2 | * | 3/2015 | Lockard .................. F16H 55/06 606/82 |
| 9,907,564 | B2 | * | 3/2018 | Lockard ............... A61B 17/221 |
| 2011/0160740 | A1 | * | 6/2011 | Makower ........... A61M 25/1011 606/115 |
| 2021/0085158 | A1 | | 3/2021 | Ikuma et al. |

* cited by examiner

*Primary Examiner* — Tan-Uyen T Ho
*Assistant Examiner* — Cherie M Poland
(74) *Attorney, Agent, or Firm* — Schwegman Lundberg & Woessner, P. A.

(57) ABSTRACT

Systems and methods are disclosed including apparatuses and methods for endoscopy such as an endoscope device operable to produce suction. An endoscope can include or use a cylinder for use at a distal end of an endoscope, and the cylinder can include a cylinder channel extending from a first end of the cylinder to a second end of the cylinder, and a rotor arranged within a working channel of the endoscope at the distal end of the endoscope. The rotor can be movable within the cylinder or the channel such as to help fragment or clear foreign bodies during a procedure.

19 Claims, 7 Drawing Sheets

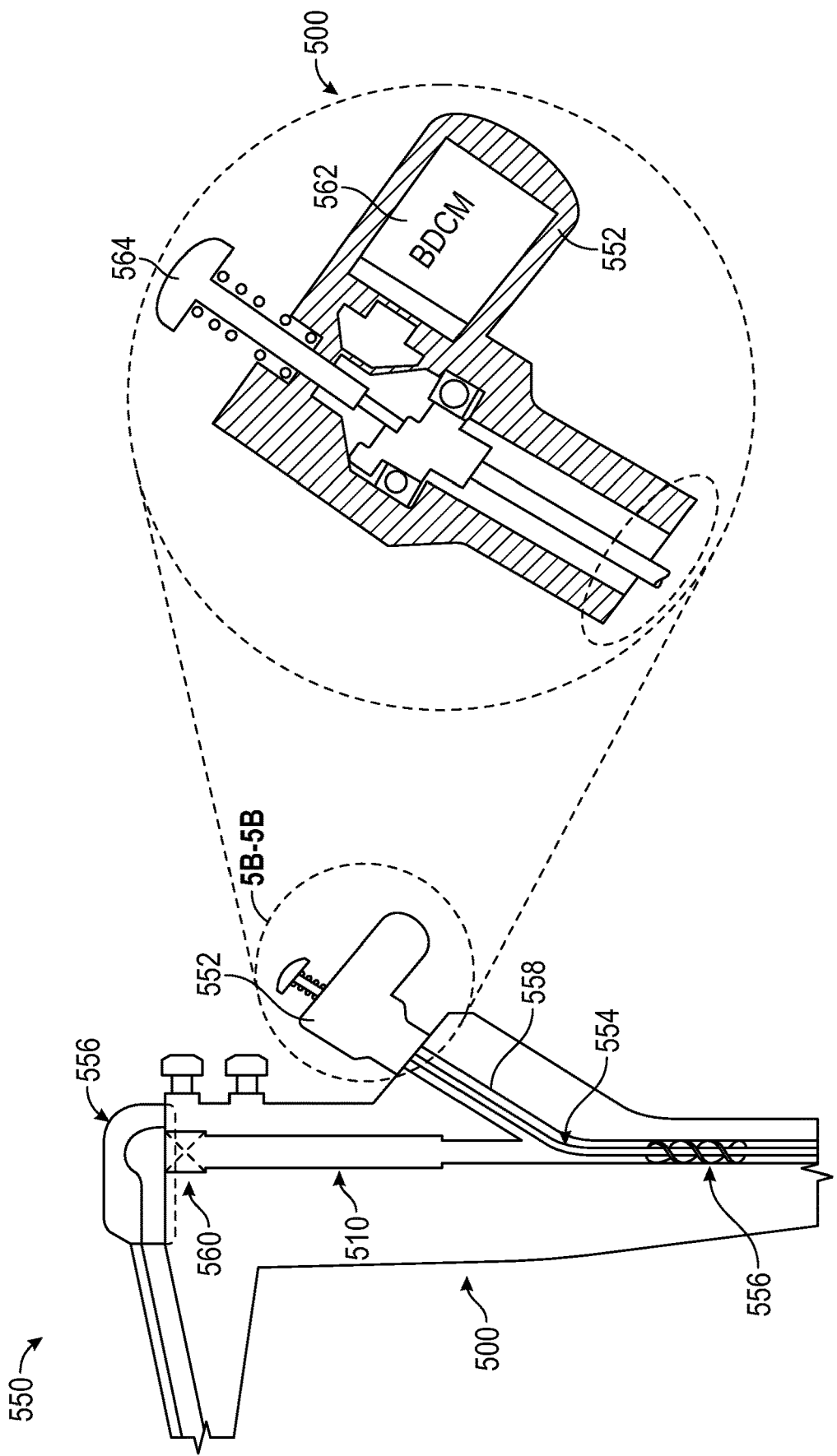

FLEXIBLE SCOPE WITH IMPROVED SUCTION

CLAIM OF PRIORITY

This application claims priority to U.S. provisional Application Ser. No. 63/262,875, filed on Oct. 21, 2021, and Ser. No. 63/363,074, filed on Apr. 15, 2022, which are incorporated by reference herein in their entirety, and the benefit of priority of each of which is claimed herein.

TECHNICAL FIELD

This document pertains generally, but not by way of limitation, to endoscopy and more particularly to operations for gastrointestinal bleeding.

BACKGROUND

Conventional endoscopes can be involved in a variety of clinical procedures, including, for example, illuminating, imaging, detecting and diagnosing one or more disease states, providing fluid delivery (e.g., saline or other preparations via a fluid channel) toward an anatomical region, providing passage (e.g., via a working channel) of one or more therapeutic devices for sampling or treating an anatomical region, and providing suction passageways for collecting fluids (e.g., saline or other preparations) and the like.

In conventional endoscopy, the distal portion of the endoscope can be configured for clearing a surgical site of obstructing foreign bodies, such as with the use of suction. Also, in endoscopic treatment of gastrointestinal (GI) bleeding, a hemostasis technique can be used to treat a subject. Hemostasis techniques can be used, for instance, in the case of an emergency such as to treat a bleeding injury. Hemostasis techniques can be used to restrict blood flow such as to help enable a subject bodily response of coagulation or blood clotting. Such hemostasis techniques can require an unobstructed view and access to the tissue site of the bleeding injury.

Overview

The present disclosure relates to endoscopes for use in gastrointestinal procedures. Herein, endoscopes can relate to disposable/single-use endoscopes, bronchoscopes, duodenoscopes, laryngoscopes, fiberscopes, and other types of endoscopes. Endoscopes described herein can help improve suction performance as well as foreign object mitigation during a rapid GI procedure.

Example 1 can include or use subject matter such as a medical system comprising: a cylinder configured for use at a distal end of an endoscope, the cylinder including a cylinder channel extending from a first end of the cylinder to a second end of the cylinder; and a first rotor arranged within a working channel of the endoscope at the distal end of the endoscope, the first rotor moveable between: a first rotor position wherein a first end of the first rotor extends through the cylinder channel flush with or protruding from the first end of the cylinder; and a second rotor position wherein the first end of the first rotor extends through the cylinder channel recessed from the first end of the cylinder.

Example 2 can include, or can optionally be combined with the subject matter of Example 1, further comprising a second rotor arranged within the working channel between the first rotor and a proximal end of the endoscope.

Example 3 can include, or can optionally be combined with the subject matter of any of Examples 1-2, wherein the first rotor is arranged to modulate air pressure within the working channel during rotation of the first rotor.

Example 4 can include, or can optionally be combined with the subject matter of Example 3, wherein: rotation of the first rotor in a first rotary direction creates vacuum pressure in the working channel; and rotation of the first rotor in a second rotary direction creates plenum pressure in the working channel.

Example 5 can include, or can optionally be combined with the subject matter of any of Examples 1-4, further comprising a flexible rotary shaft arranged within the working channel of the endoscope, a first end of the flexible rotary shaft couplable with the first rotor at a second end of the first rotor.

Example 6 can include, or can optionally be combined with the subject matter of Example 5, wherein the flexible rotary shaft is couplable to a drive at a second end of the flexible rotary shaft.

Example 7 can include, or can optionally be combined with the subject matter of Example 6, further comprising an actuator movable between: a first actuator position that locates the first rotor at the first rotor position; and a second actuator position that locates the first rotor is moved to the second rotor position in which the drive is concurrently actuated.

Example 8 can include, or can optionally be combined with the subject matter of any of Examples 1-7, wherein the first end of the cylinder includes a plurality of serrations.

Example 9 can include, or can optionally be combined with the subject matter of any of Examples 1-8, wherein the first end of the cylinder includes a plurality of jaws.

Example 10 can include, or can optionally be combined with the subject matter of any of Examples 1-9, further comprising a remote suction valve couplable to a proximal end of the endoscope and configured to provide suction to the working channel.

Example 11 can include or use subject matter such as a surgical device comprising: a probe shaft having a distal end and a working channel extending through the probe shaft; a cylinder configured for use at a distal end of the probe shaft, the cylinder including a cylinder channel extending from a first end of the cylinder to a second end of the cylinder; and a first rotor arranged within the working channel of the probe shaft at the distal end of the probe shaft, the first rotor moveable between: a first rotor position wherein a first end of the first rotor extends through the cylinder channel flush with the first end of the cylinder; and a second rotor position wherein the first end of the first rotor extends through the cylinder channel recessed from the first end of the cylinder.

Example 12 can include, or can optionally be combined with the subject matter of Example 11, further comprising a second rotor arranged within the working channel between the first rotor and a proximal end of the probe shaft.

Example 13 can include, or can optionally be combined with the subject matter of any of Examples 11-12, wherein the first rotor is arranged to modulate air pressure within the working channel during rotation of the first rotor.

Example 14 can include, or can optionally be combined with the subject matter of Example 13, wherein: rotation of the first rotor in a first rotary direction creates vacuum pressure in the working channel; and rotation of the first rotor in a second rotary direction creates plenum pressure in the working channel.

Example 15 can include, or can optionally be combined with the subject matter of any of Examples 11-14, further comprising a cable arranged within the working channel of the probe shaft, a first end of the cable couplable with the first rotor at a second end of the first rotor.

Example 16 can include or use subject matter such as a method for performing endoscopy using an endoscopic probe shaft including a working channel, the method comprising: providing or obtaining a cylinder configured for use at a distal end of the probe shaft, the cylinder including a cylinder channel extending therethrough; moving a rotor between: a first rotor position wherein the rotor extends through the cylinder channel even or flush with a distal end of the cylinder; and a second rotor position wherein the rotor extends through the cylinder channel recessed from a the distal end of the cylinder; and selectively rotating, via a drive, the rotor to modulate an air pressure within the working channel; fragmenting foreign bodies within the working channel; and applying suction to the working channel to draw the fragmented foreign bodies out of the working channel.

Example 17 can include, or can optionally be combined with the subject matter of Example 16, wherein selectively rotating comprises: rotating the rotor in a first rotary direction to create vacuum pressure in the working channel; and rotating the rotor in a second rotary direction to create plenum pressure in the working channel.

Example 18 can include, or can optionally be combined with the subject matter of Example 17, further comprising selectively operating an actuator including: selecting a first actuator position that locates the rotor at the first rotor position; and selecting a second actuator position that locates the rotor is moved to the second rotor position in which the drive is concurrently actuated.

Example 19 can include or use subject matter such as at least one machine-readable medium including instructions that, when executed by processing circuitry, cause the processing circuitry to perform operations to implement of any of Examples 1-18.

Example 20 can include or use subject matter such as an apparatus comprising means to implement of any of Examples 1-18.

Example 21 can include or use subject matter such as a system to implement of any of Examples 1-18.

Example 22 can include or use subject matter such as a method to implement of any of Examples 1-18.

Each of these non-limiting examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE FIGURES

FIG. 5A is a partial cross sectional view of an endoscope handle including a drive unit for a rotor.

FIG. 5B is a partial cross sectional view of an endoscope handle including a drive unit for a rotor.

DETAILED DESCRIPTION

This disclosure relates to devices and methods for increasing suction in an endoscope and for mitigating clogging of foreign bodies or objects within a medical device during a procedure. It can be challenging to adapt certain endoscopes to an emergency operation such as "emergency bleeds" in the gastric anatomy. Since endoscopes are not used frequently in an emergency room (ER) or intensive care unit (ICU) environment, sufficient facilities or personnel for cleaning reusable endoscopes are generally unavailable. Instead, single use (SU) endoscopes can be used in ER/ICU without the need to provide cleaning systems at the facility and to train the personnel in such cleaning procedures. A challenge with using some SU endoscopes is they may not adequately handle emergency bleeding such as to replace reusable large channel scopes due to a smaller channel size. The present inventors have realized, among other things, the need for devices and/or methods to help enable efficient and effective hemostasis in a wide variety of treatment settings such as emergency treatment in an ER or ICU.

Figure 1A:
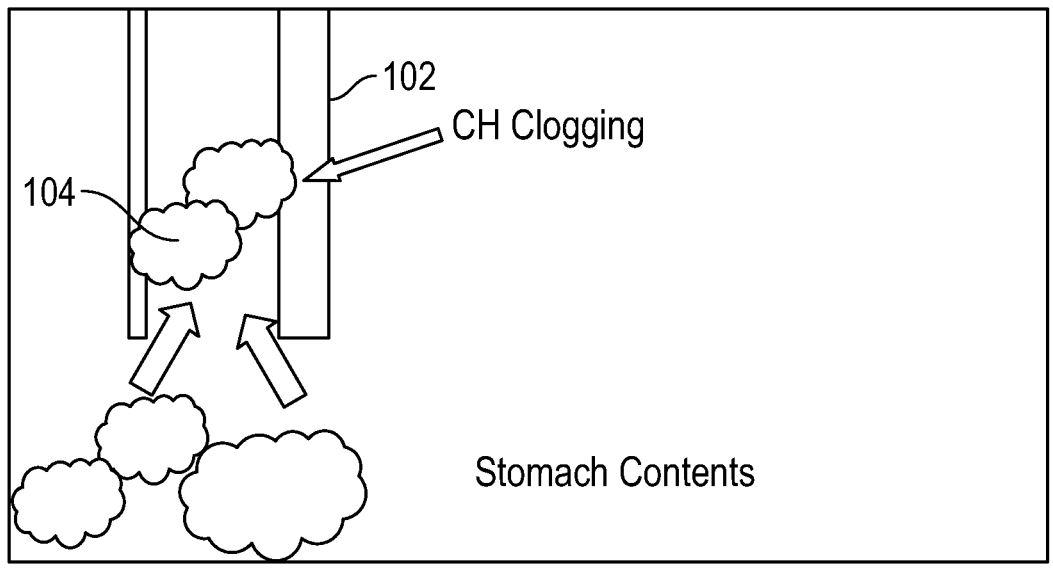
FIG. 1A is a diagrammatic view depicting an example of an endoscope channel becoming clogged during a procedure.

This disclosure generally describes apparatuses and methods for endoscopy and more particularly for gastrointestinal medical procedures. FIG. 1A shows an example of an endoscope channel 102 clogging during a procedure. In some instances, such as during a medical emergency, subjects are unable to manage the contents of the stomach. In certain cases, patients undergoing a rapid or unexpected procedure can have more foreign bodies 104, e.g., stomach contents, than patients scheduled for more routine surgeries such as a GI endoscopy, and therefore, the prevalence of endoscope channel 102 clogging can be higher. Clogging of foreign bodies 104 may inhibit access to the surgical site through the endoscope channel 102 and further may inhibit visibility of the surgical site.

Figure 1B:
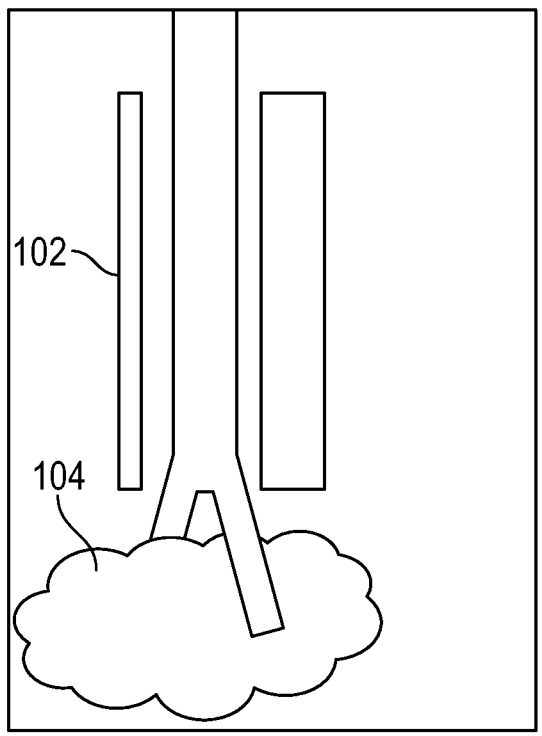
FIG. 1B is a diagrammatic view depicting an example of a technique for mitigating endoscope clogging during a procedure.
Figure 1C:
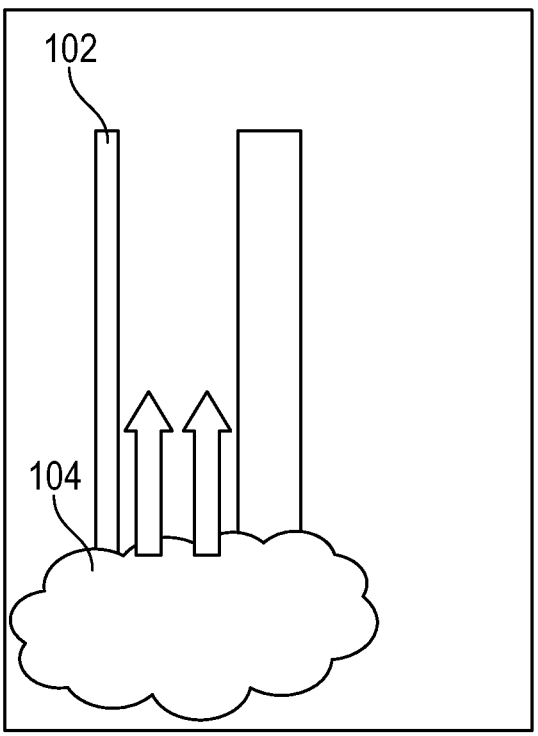
FIG. 1C is a diagrammic view depicting techniques to mitigate endoscope clogging during a procedure.

FIG. 1B and FIG. 1C show an example of approaches to mitigate endoscope clogging during a procedure. A technique for GI endoscopy can include delivering suction to the endoscope channel 102 such as via a medical supply outlet found at hospital or other healthcare facility. Here, the vacuum pressure supplied by the outlet can be limited. In one approach, a foreign body 104 that cannot be completely suctioned can become lodged within the endoscope channel 102, creating a clog. The clog can be removed by withdrawing the endoscope from the surgical site, dislodging the foreign body 104 from the endoscope channel 102, and re-inserting the endoscope into the patient to complete the procedure. A plurality of foreign bodies 104, or fragments thereof, can coagulate to create a similar clog requiring a similar removal. Also, in instances where the foreign body is larger than the diameter of the endoscope channel 102 and therefore cannot be suctioned into the endoscope channel 102, it can likewise be necessary to withdraw, clean, and reinsert the endoscope into the surgical site. For example, the endoscope can be withdrawn from the body while grasping the foreign object by treatment equipment embedded within the endoscope channel 102 (See FIG. 1B) or the endoscope can be ejected from the body with the foreign object fixed to the distal end by negative pressure on the endoscope channel 102. (See FIG. 1C). A challenge to this approach is that removing and re-inserting the endoscope can interrupt and/or complicate the procedure, thereby increasing the duration of the procedure and/or exposing the patient to increased safety risks.

Figure 2B:
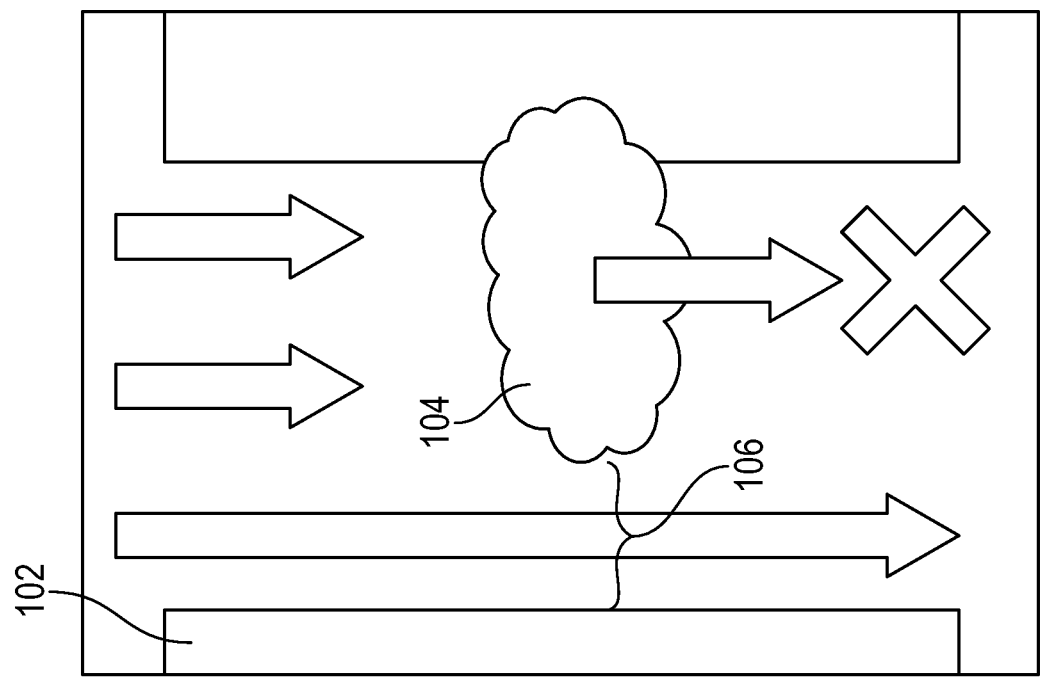
FIG. 2B is a diagrammic view depicting techniques to mitigate endoscope clogging during a procedure.
Figure 2A:
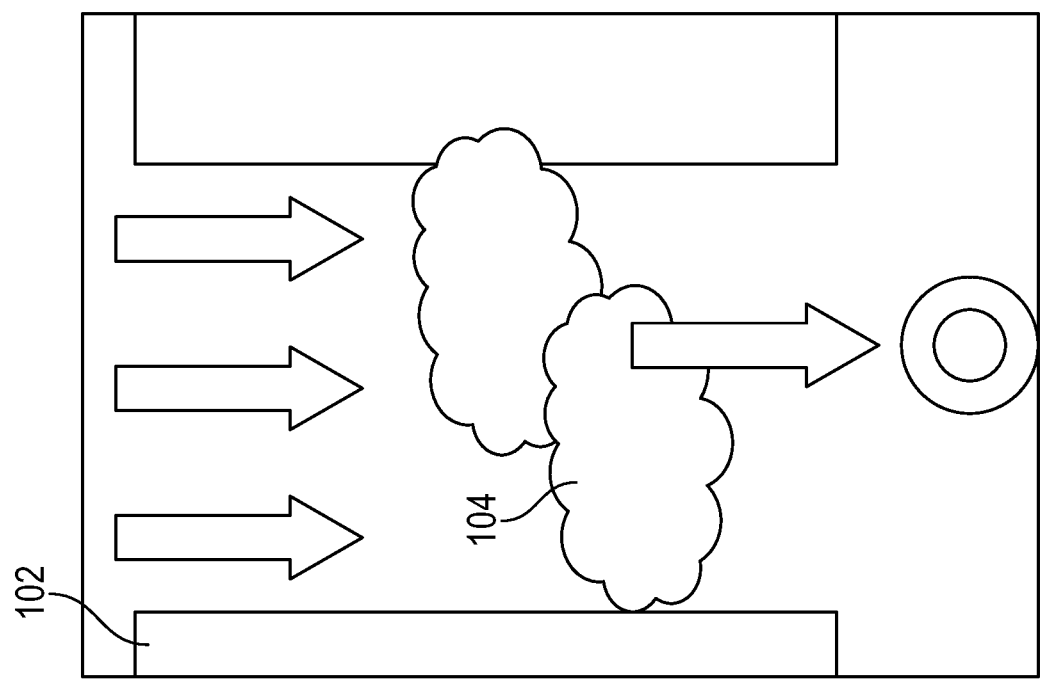
FIG. 2A is a diagrammatic view depicting techniques to mitigate endoscope clogging during a procedure.

FIG. 2A and FIG. 2B show further exemplary approaches to mitigate endoscope clogging during a procedure. For example, a foreign body 104 can be purged from the endoscope channel 102 such as by sending a pressurized fluid flow, such as air or water, through the endoscope channel 102. A challenge with this approach is that in some instances, such as if the foreign body 104 does not block the entire diameter of the channel, a portion of the pressurized fluid flow can "leak" or escape the endoscope without dislodging the foreign body 104. This can decrease the pressure of the flow acting on the foreign body 104. In an example where the pressurized fluid flow is delivered to the endoscope channel 102 via the medical supply outlet such as at hospital or other healthcare facility, the available pressure can be limited to between about 400 mmHg to about 500 mmHg. As such, some approaches of purging the endoscope channel 102 can carry the challenges described above with respect to suction: removing and re-inserting the endoscope from the body to clean the endoscope channel 102, interrupting or complicating the procedure. Further, standalone suction units, such as units that can supply up to about 635 mmHg are expensive and inconvenient to implement into medical practice. Therefore, alternative techniques for maximizing an effective vacuum pressure and purge pressure supplied to a GI endoscope for mitigating foreign bodies during a procedure are desirable. As described in detail below, the present disclosure relates to such endoscopes and endoscope attachments for use in gastrointestinal procedures. Herein, endoscopes can relate to disposable/single-use endoscopes, bronchoscopes, duodenoscopes, laryngoscopes, fiberscopes, and other types of endoscopes. Endoscopes described herein can help improve suction performance as well as foreign object mitigation during a rapid GI procedure.

Figure 3A:
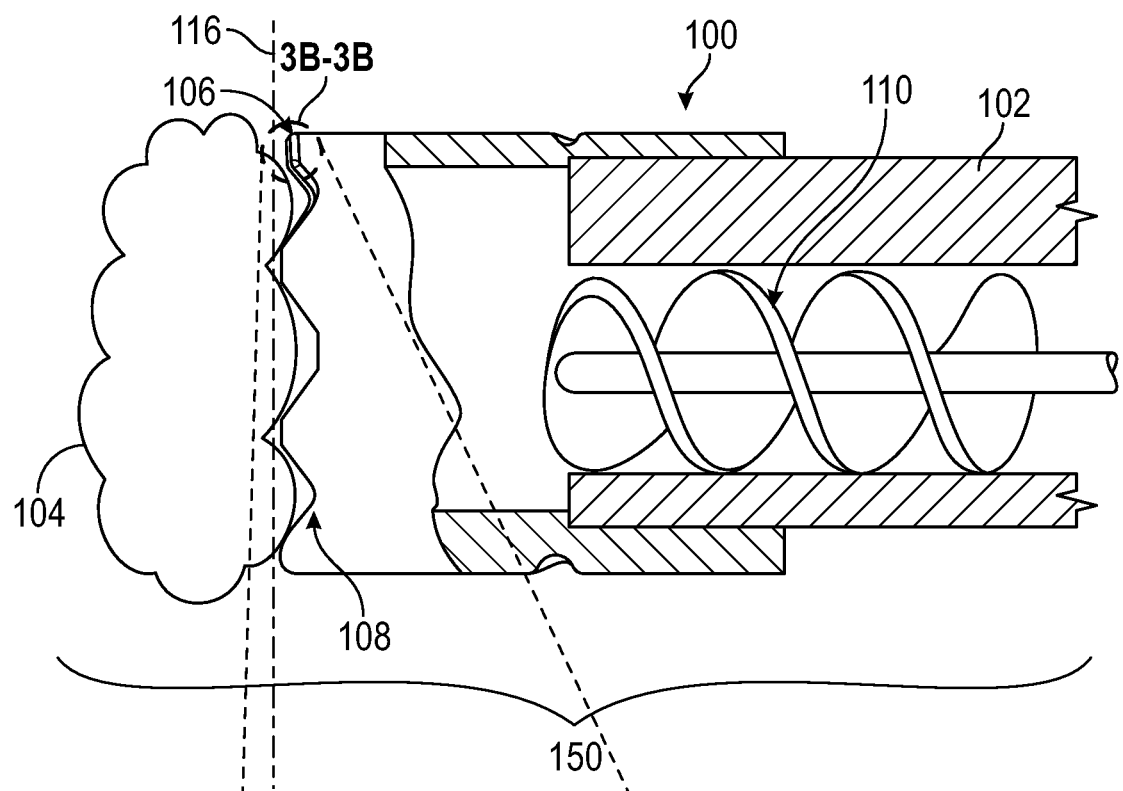
FIG. 3A is a partial cross sectional view of a distal end of an endoscope.
Figure 3B:
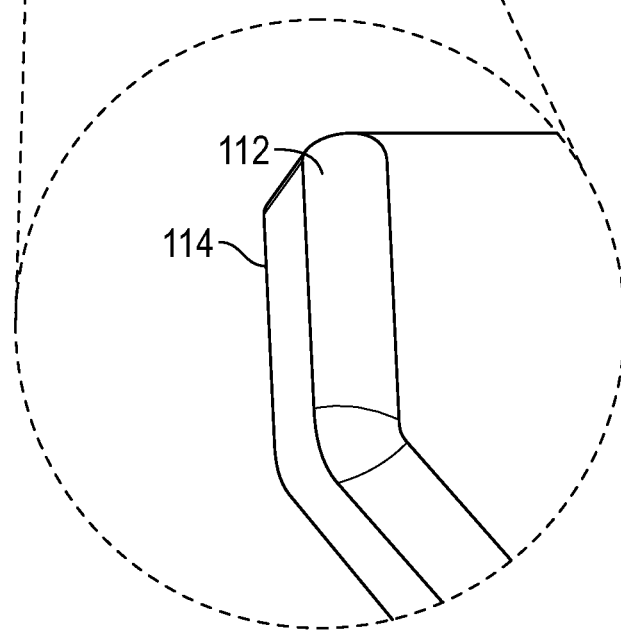
FIG. 3B is a magnified view of a distal end of an endoscope

FIG. 3A and FIG. 3B depict a distal tip attached at a distal end of an endoscope. In an example, the endoscope 100 can include or use an endoscope channel 102, a distal tip attachment 106, and a rotor 110. The business end, or distal end 150, of the endoscope 100 can be used such as to contact and treat the surgical site. As shown in FIG. 3A, the foreign body 104 or a cluster of several foreign bodies 104 may be too large to pass through the endoscope channel 102. In an example, the distal end 150 of the endoscope 100 can include or use the distal tip attachment 106 such as to at least partially protect or block the distal end 150 from foreign bodies 104 and to keep foreign bodies 104 away from a viewing area, such as located within or near the distal tip attachment 106. The distal tip attachment 106 can be formed of a clear material such as to help enable a physician to retain view of the surgical site during the procedure. The distal tip attachment 106 can also include or use a viewing window or other viewing features formed of a non-clear material such as to help enable a physician to retain view through of the surgical site therethrough. A terminal surface 108 of the distal tip attachment 106 can be atraumatic to the surgical site, such as to help mitigate tissue injury from the terminal surface 108, while including or using a serrated or crown-shaped form. Serrations or features embedded in the terminal surface 108 can hold, grip, catch, or otherwise provide friction against one or more foreign bodies 104 while under suction pressure. For example, the terminal surface 108 can hold or secure the foreign body 104 stable such that it can resist rotational force from the rotor 110. Holding the foreign body 104 against the rotational force of the rotor 110 can help prevent a foreign body 104 from becoming stuck or caught on the end of the rotor 110 and rotating therewith. For example, friction applied on the foreign body 104 by the terminal surface 108 can prevent the foreign body 104 from resisting suction from the endoscope channel 102 or eluding an axial screw force from threads of the rotor 110.

In an example, as depicted in the magnified example in FIG. 3B, an outer edge 112 of the terminal surface 108 can be smoothed, rounded, beveled, chamfered, or otherwise have a dulled or blunted profile while an inner edge 114 of the terminal surface 108 can have a sharper or more squared profile than that of the outer edge 112. Roughly speaking, corner profiles of the inner edge 114 and outer edge 112, an edge radius of the outer edge 112 can be of greater magnitude than an edge radius of the inner edge 114. Examples herein can include an inner edge 114 or an outer edge 112 including a non-uniform profile. Here, an average edge radius along the perimeter of the outer edge 112 can be of greater magnitude than an average edge radius along the perimeter of the inner edge 114. Further, in an example the endoscope 100 or the distal tip attachment 106 can include a longitudinal extension that is non-circular, such as substantially oval-shaped, polygon-shaped, rectangle-shaped, or another symmetrical or asymmetrical-shaped longitudinal extension. Here as well, an average edge radius along the perimeter of the outer edge 112 can be of greater magnitude than an average edge radius along the perimeter of the inner edge 114. Also, in the above examples, the outer edge 112 can alternatively or additionally use a material having a lower durometer than that of the inner edge 114.

While depicted in FIG. 3A as a distal tip attachment 106, the distal tip attachment 106 can also be cast with the endoscope 100, permanently fixed to the endoscope 100, machined into the endoscope 100, or otherwise permanently integrated with the distal end 150 of the endoscope 100. Also, the endoscope 100 can be removably couplable with a removable distal tip attachment 106, such that a healthcare provider can couple the distal tip attachment 106 to the endoscope channel 102 of the endoscope 100, such as by fitting the distal tip attachment 106 over an outer dimension at or near the distal end 150 of the endoscope 100. The endoscope 100 or the distal tip attachment 106 can include or use tongue/groove features, cam/channel features, magnetic connections, a hinge, a threaded connection, a mechanical lock, a snap fit connection, a a pressure/friction fit connection, or the like for securing the distal tip attachment 106 to the endoscope channel 102 at or near the distal end 150 of the endoscope 100. For example, as depicted in FIG. 3A, an outer diameter of the endoscope channel 102 can be about equal to an inner diameter of the distal tip attachment 106. Also, an outer diameter of the distal tip attachment 106 can be greater than an inner diameter of the endoscope channel 102. Where the endoscope 100 is an SU endoscope, a plurality of distal tip attachments 106 can be used with the endoscope 100 during its "single use". For example, the distal tip attachment 106 can be quickly replaced during a procedure such as to prolong the use of the endoscope 100 and enable an efficient procedure. Also, the distal tip attachments 106 having procedure-specific features, such as different terminal surfaces 108 or different opacities or viewing features can be swapped interchangeably during use of the endoscope 100 to help enable flexibility for the health care provider during the procedure.

Figure 3C:
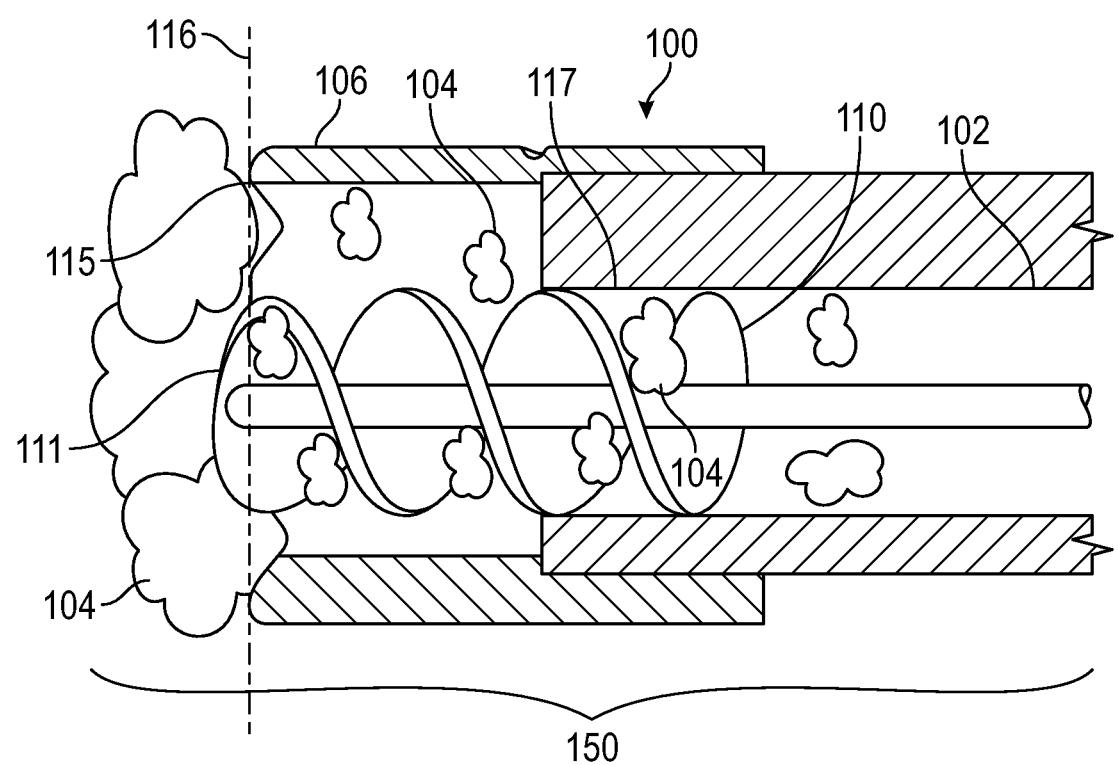
FIG. 3C is a cross sectional view of a distal tip attached at a distal end of an endoscope.

FIG. 3C depicts a cross section of an endoscope at a distal end. The endoscope 100 can include or use the rotor 110 located within a space defined by the endoscope channel 102. The rotor 110 can include any of an auger, a screw, a propeller, or an impeller. The rotor 110 can be axially extendible in the distal direction towards the distal tip attachment 106. For example, the rotor 110 can be articulated axially between a first rotor position (depicted in FIG. 3C) and a second rotor position 556 (depicted in FIG. 5A), the position of the rotor 110 being relative to the distal tip attachment 106. For example, in the first rotor position, a first end 111 of the rotor 110 can extend through an opening 115 defined by the distal tip attachment 106 such that it is flush with a plane 116 intersecting the terminal surface 108. Herein, "flush with" can also mean even with or in line with. Also, in the first rotor position, the first end 111 of the rotor 110 can slightly protrude from the plane 116 intersecting by the terminal surface 108 (depicted in FIG. 3C). Here, plane 116 refers to a plane intersecting two or more of the distal-most features of the terminal surface 108 embedded within the distal tip attachment 106. The rotor 110 can be axially retractable to the second rotor position where the first end 111 of the rotor 110 can extend through the distal tip attachment 106 recessed from the plane defined by the terminal surface 108 (depicted in FIG. 3A). For example, the rotor 110 can be extended to the first rotor position such as to fragment, cut, eject, or otherwise disrupt a foreign body 104 located near the terminal surface 108. The rotor 110 can also be retracted to the second rotor position such as 1) to withdraw the rotor 110 from the atraumatic terminal surface 108, helping to promote safety, and 2) to increase a vacuum pressure created by a helix of the rotor 110 due to increased helical surface area contacting or near-contacting an inner surface 117 of the endoscope channel 102. In an example, the rotor 110 can be biased towards the second rotor position. As such, the rotor 110 can be extended to the first rotor position against the bias, and the rotor can temporarily meet or protrude from plane 116 such as to "shave" a foreign body 104 lodged in features of the distal tip attachment 106. The rotor 110 can also be biased towards the first rotor position. For example, the rotor 110 can include or use or be manipulated by a bias such as a compression spring, a leaf spring, a torsion spring, a metal bellows, and the like.

The rotor 110 can include or use any type of helix or partial helix such as blades, threads, helical ribs, vanes, or other features for converting a rotational motion to axial force in the same direction as the vacuum pressure. This rotor 110 can be manufactured or assembled such as by overmolding or other attachment to, e.g., a flexible stainless-steel shaft or cable. The rotor 110 can be formed from a low-durometer material. For example, the rotor 110 can include a superficial material having a durometer of less than 90 shore A. For example, the rotor 110 can include a superficial material having a durometer between about 70 Shore A and about 90 Shore A. As such, the rotor 110 can be atraumatic to the surgical site, such as to help mitigate tissue injury.

The rotor 110 can produce vacuum pressure similar to a screw compressor in that rotation of the rotor 110 in a first direction can create suction at a distal end of the endoscope channel 102. The rotation of the screw can provide an additional push such as to pressurize the flow in the proximal direction. Such additional push can complement the existing suction pressure from the vacuum pump or the hospital line suction.

Figure 4A:
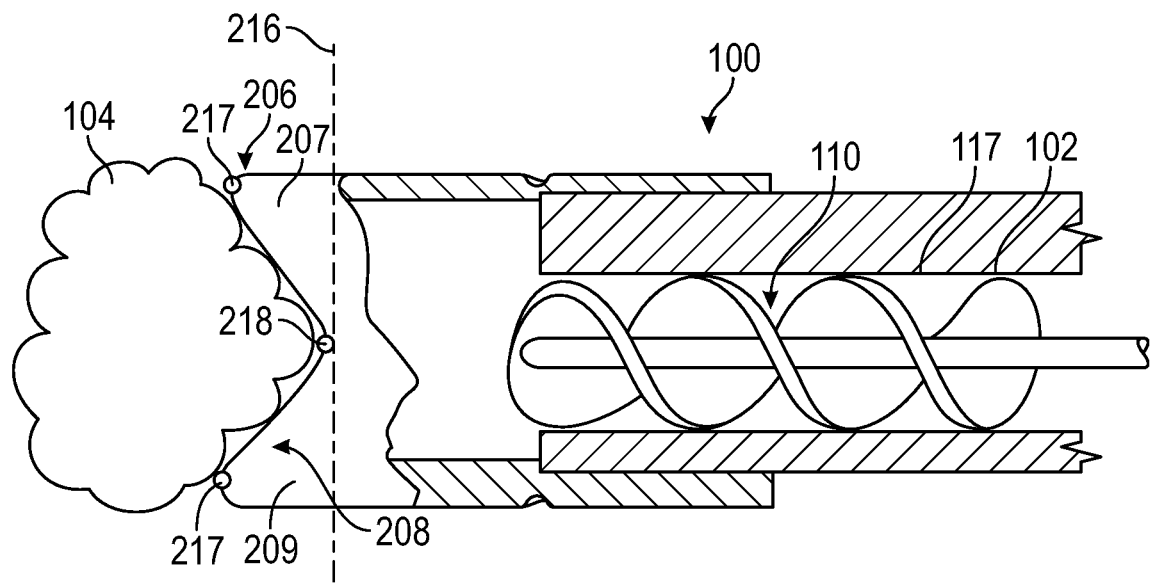
FIG. 4A is a partial cross sectional view of a distal end of an endoscope with an exemplary distal tip attachment disposed therein.
Figure 4B:
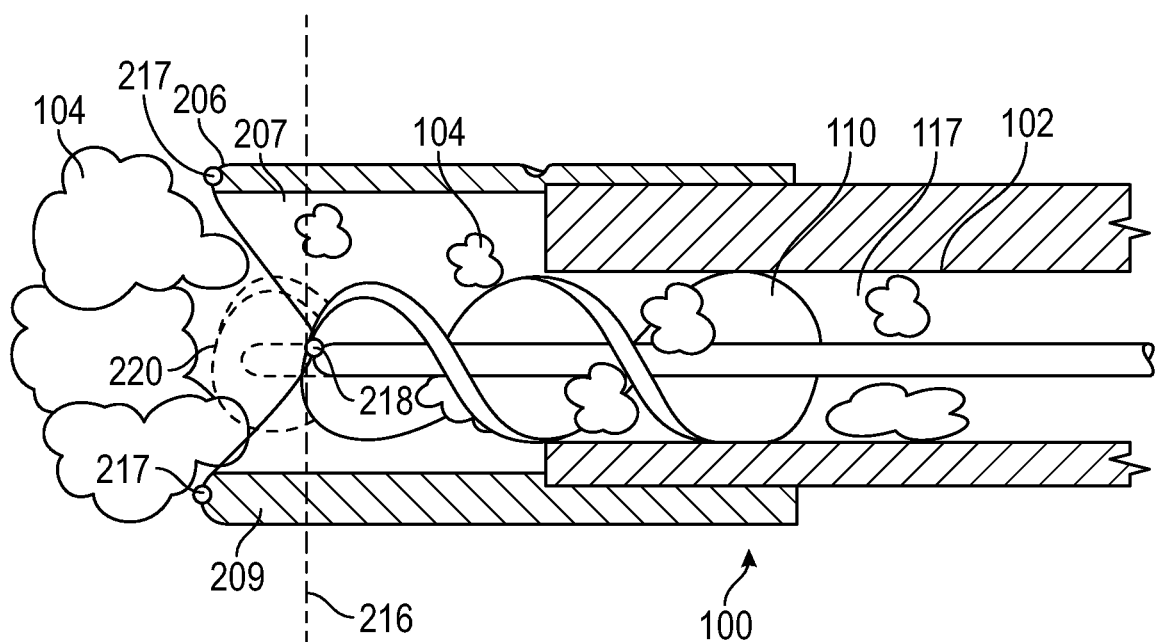
FIG. 4B is a cross sectional view of a distal end of an endoscope depicting an exemplary a distal tip attachment in use.

FIG. 4A and FIG. 4B depict another example of a distal tip attachment in use with an endoscope 100. The distal tip attachment 206 can be substantially similar to the distal tip attachment 106 of FIG. 3A and FIG. 3C. The components, structures, configurations, functions, etc. of the distal tip attachment 206 can therefore be the same as or substantially similar to that described in detail above with reference to the distal tip attachment 106. The distal tip attachment 206 can include a terminal surface 208, and the terminal surface 208 can be atraumatic to the surgical site, such as to help mitigate tissue injury from the terminal surface 208. Here, the terminal surface 208 can include or use a V-shaped form including two opposing jaws 207 and 209. Here, the two opposing jaws 207 & 209 can be stationary relative to each other, and each jaw can be defined by the distal protrusions formed by the "high" points 217 of the "V" included in the V-shaped form of the terminal surface 208. Serrations or features embedded in the terminal surface 208, such as the jaws, can hold, grip, catch, or otherwise provide friction against one or more foreign bodies 104. The rotor 110 can be axially extendible in the distal direction towards the distal tip attachment 206. For example, the rotor 110 can be articulated axially between a first rotor position, as depicted in FIG. 4B, and a second rotor position, as depicted in FIG. 4A, the position of the rotor 110 being relative to the distal tip attachment 206. For example, in the first rotor position, a first end 111 of the rotor 110 can extend through an opening defined by the distal tip attachment 206 such that it is even or flush with a plane 216 intersecting the "low" points 218 of the "V" included in the V-shaped form of the terminal surface 208. Also, in the first rotor position, the first end 111 of the rotor 110 can slightly protrude from the plane 216 intersecting the "low" points 218 of the "V" included in the V-shaped form of the terminal surface 208 (depicted in FIG. 4B). The rotor 110 can be axially retractable to the second rotor position where the first end 111 of the rotor 110 can extend through the distal tip attachment 206 recessed from plane 216 (depicted in FIG. 4A). For example, the rotor 110 can be extended to the first rotor position such as to fragment, cut, eject, or otherwise disrupt a foreign body 104 located near the terminal surface 208. The rotor 110 can also be retracted to the second rotor position such as 1) to withdraw the rotor 110 from the atraumatic terminal surface 208, helping promote safety, and 2) to increase supplemental pressure created by a helix of the rotor 110 due to increased helical surface area contacting or near-contacting an inner surface 117 of the endoscope channel 102. In an example, the rotor 110 can be biased towards the second rotor position. As such, the rotor 110 can be extended to the first rotor position against the bias, and the rotor can temporarily meet or protrude from the plane 216 such as to "shave" a foreign body 104 lodged in features of the distal tip attachment 106. The rotor 110 can also be biased towards the first rotor position.

In the example depicted in FIG. 4A and FIG. 4B, a cutting zone 220 of the rotor 110 in the first rotor position is recessed from and proximal to points 217. For example, the endoscope 100 can be manipulated by the healthcare provider during a procedure to position foreign bodies within the cutting zone 220 while using the jaws as a stop or guard over the shaving element, rotor 110, in the first rotor position. This flexibility can permit proximity of the foreign body 104 to the rotor 110 while mitigating a risk of the rotor 110 making contact with the gastric anatomy tissues.

FIG. 5A and FIG. 5B depict an endoscope handle 550 including a drive unit for a rotor. The endoscope 500 depicted in FIG. 5A and FIG. 5B can be substantially similar to the endoscope 100 described above. The components, structures, configurations, functions, etc. of the endoscope 500, such as the endoscope channel 510 can therefore be the same as or substantially similar to that described in detail above, such as the endoscope channel 102. The endoscope handle 550 can include or use a rotational drive unit 552 such as to rotate one or more rotors (such as rotor 556 described below) within the endoscope channel 510. This rotational drive unit 552 can include or use a low-cost electric brushed DC motor (such as motor 562 depicted in FIG. 5B), an air motor which can receive air pressure from the hospital pressurized airline source, or it can be a manually driven mechanism by hand. The rotational drive unit 552 can be operated via one or more actuators 564. Also, one or more rotor included in or used by the endoscope 500 can be manipulated via the one or more actuators. As depicted in FIG. 5B, the actuator 564 can be spring biased such that releasing pressure on the actuator 564 causes one or more rotors, to retract proximally in a direction away from the distal end of the endoscope 500. Also, applying pressure on the actuator 564 can cause one or more rotors to extend distally in a direction away from the actuator 564. Operation of the actuator 564 can cause an individual rotor of the one or more rotors to move between a first position wherein a first end extends through the endoscope channel 510 to be flush with or protruding from a distal end of the distal tip attachment, and a second position where the first end extends through the endoscope channel 510 to be recessed from the distal end of the distal tip attachment (the first and second rotor positions depicted in FIG. 3C and FIG. 3A, respectively). Also, the actuator 564 can be spring biased such that releasing pressure on the actuator 564 causes the rotational drive unit 552 to stop, for example concurrently or simultaneously with moving the rotor between the first position and the second position. In another example, the rotational drive unit 552 can be coupled to two actuators or a bidirectional actuator. Here, the actuators 564 can respectively operate the rotational drive unit 552 in a first rotational direction and a second rotational direction opposite the first rotational direction. As such, a healthcare provider can alternate rotation of the one or more rotors between the first and second rotational directions. In an example, due to the helical surface of the rotors, operation of the rotational drive unit 552 in the first direction can cause the rotors to produce suction and operation of the rotational drive unit 552 in the second direction can cause the one or more rotors to produce plenum pressure. Herein, plenum pressure in the endoscope channel 510 refers to outward pressure in the direction of the distal end of the endoscope 500, opposite the direction of the applied suction and the suction generated by the one or more rotors. Thus, the rotational drive unit can be operated in the first rotational direction for suction and shaving, cutting, or fragmenting foreign bodies and switched to the second rotational direction, e.g., for a momentary purge of the endoscope channel 510 using the plenum pressure created by reversing the rotational direction of the one or more rotors. The endoscope 500 can include or use one or more actuators 564 included for selectively operating any or, concurrently or simultaneously, a combination of the following: a source of suction, a source of power, a rotor manipulator, one or more drives, or a safety feature such as a cover or cap.

The interface of the rotational drive unit 552 can be a removable or a fixed to the endoscope handle 550. The rotational drive unit 552 can be operably coupled to one or more rotors via a shaft 554. For example, the shaft can be a flexible shaft. The shaft 554 can be operably coupled with the "shaving" rotors described above and can alternatively or additionally be operably coupled with one or more intermediate rotors 556 located within the endoscope channel 510. The intermediate rotors 556 can help further ensure a size reduction of foreign bodies traveling through the endoscope channel 510 and can help further improve suction and eliminate clogging. The endoscope handle 550 can include or use a molded dome 556 formed from clear material or a material with visibility features such as to have a visual ability to inspect for clogging before or after the suction on/off valve.

The endoscope 500 can also include or use the endoscope channel 510, which can also be described herein as a biopsy working channel 510. The endoscope channel 510 can provide the healthcare provider access to the surgical site for one or more other surgical instruments through the endoscope handle 550. For example, the endoscope channel 510 can be used such as to introduce forceps, suction supplying conduit, a medical laser, a guidewire, a basket, or other suitable medical device for endoscopy. The rotational drive 552 and the shaft 554 can extend through the endoscope handle 550 towards the distal end of the endoscope 500 through the endoscope channel 510, a secondary channel 558, or both (as depicted in FIG. 5A).

Line suction, such as supplied via a medical supply outlet such as at hospital or other healthcare facility, can be coupled at connection 560 after the working channel can large enough such as to account for the additional suction pressure and the added ability to transport foreign body efficiently to clean up the surgical during the procedure. The rotational drive can have an alternate location in the top portion of the endoscope handle 550. This can enable for this rotational drive to be in a fixed location and allow the endoscope channel 510 to be used for any other instruments such as forceps, coagulation devices for RF (radiofrequency) bipolar or monopolar energy. If the endoscope channel is to be designed in a fixed position, then the distal tip arrangement for the various components can be oriented such as where there is a dedicated channel for suction connection (such as endoscope channel 510) as well as a dedicated channel for instrument insertion (such as secondary channel 558). In an example, the suction supplied at connection 560 can be user-actuatable such as to produce short, momentary bursts of vacuum pressure supplied to the endoscope channel 510. For example, the suction can be actuated concurrently or simultaneously with operation of the actuator 564, such as to coordinate actuation of line suction from connection 560, suction produced by the rotors, and fragmentation of foreign bodies using the rotors. In another example, the line suction can be remotely actuated by a solenoid valve located remote from the handle 550. For example, the solenoid valve can be located at or near a medical supply outlet. In an example, the solenoid valve can be remotely operated such as by an actuator located at or near the handle 550.

Figure 6:
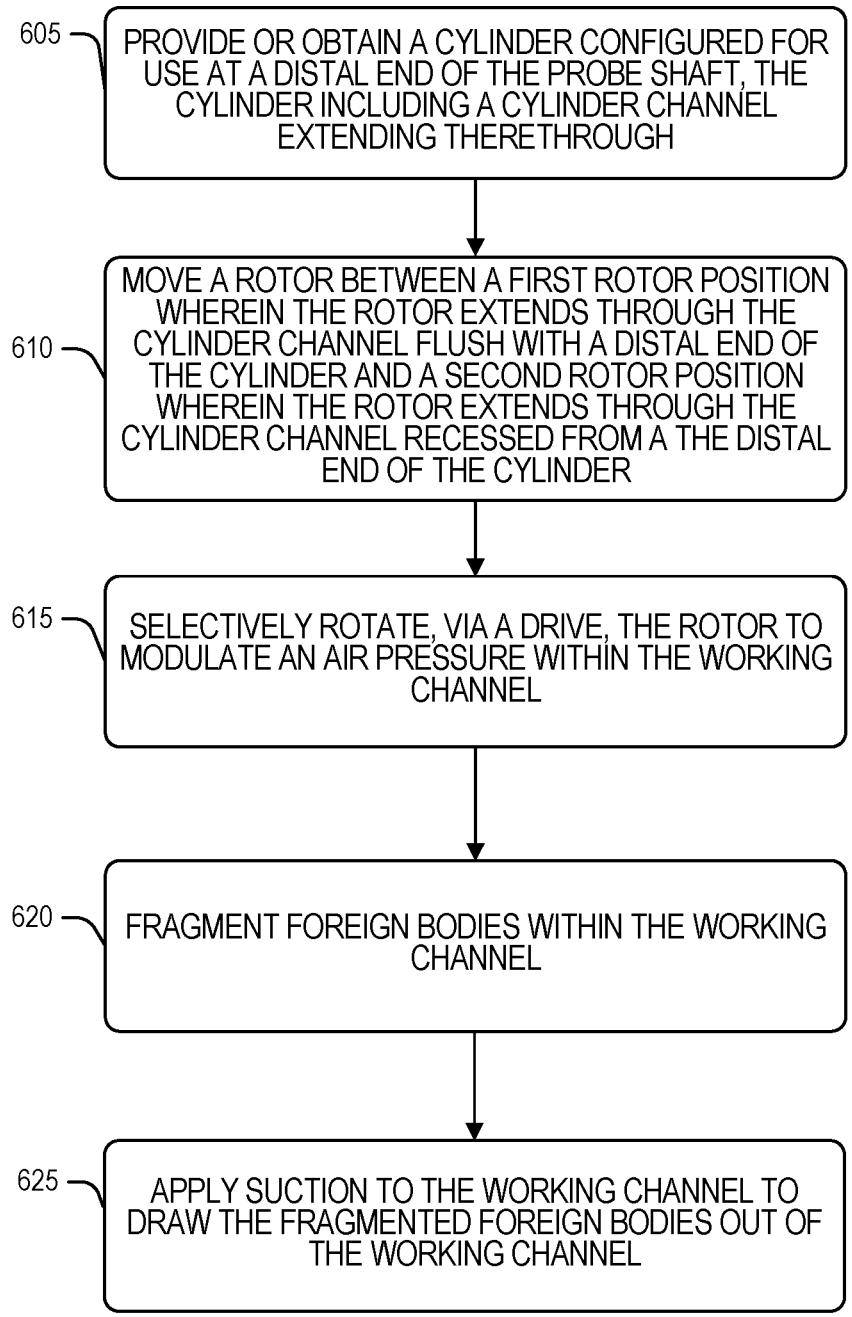
FIG. 6 illustrates a flow diagram of an example of a method for performing endoscopy using an endoscopic probe shaft including a working channel, according to an example.

FIG. 6 illustrates a flow diagram of an example of a method 600 for performing endoscopy using an endoscopic probe shaft including a working channel, according to an example.

At operation 605, a cylinder can be provided or obtained, the cylinder configured for use at a distal end of the probe shaft, the cylinder including a cylinder channel extending therethrough.

At operation 610, a rotor can be moved between a first rotor position wherein the rotor extends through the cylinder channel flush with a distal end of the cylinder and a second rotor position wherein the rotor extends through the cylinder channel recessed from a distal end of the cylinder.

At operation 615, the rotor can be selectively rotated, via a drive, such as to modulate an air pressure within the working channel. Such selective rotation can include rotating the rotor in a first rotary direction to create vacuum pressure in the working channel and rotating the rotor in a second rotary direction to create plenum pressure in the working channel. Also, a device actuator can be selectively operated, for example including selecting a first actuator position that locates the rotor at the first rotor position and selecting a second actuator position that locates the rotor is moved to the second rotor position in which the drive is concurrently actuated.

At operation 620, foreign bodies within the working channel can be fragmented.

And, at operation 625, suction can be applied to the working channel to draw the fragmented foreign bodies out of the working channel.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more Examples thereof), either with respect to a particular example (or one or more Examples thereof), or with respect to other examples (or one or more Examples thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described examples (or one or more Examples thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations.

What is claimed is:

1. A medical system comprising:
   a cylinder configured for use at a distal end of an endoscope including an endoscope probe shaft having a distal end and an endoscope working channel extending through the probe shaft, the cylinder including a cylinder channel extending from a first end of the cylinder to a second end of the cylinder, wherein the first end of the cylinder defines a distal-most aperture of the working channel; and
   a first rotor arranged within a working channel of the endoscope at the distal end of the endoscope, the first rotor moveable between:
      a first rotor position wherein a first end of the first rotor extends through the cylinder channel flush with or protruding from the distal-most aperture defined by the first end of the cylinder; and
      a second rotor position wherein the first end of the first rotor extends through the cylinder channel recessed from the distal-most aperture defined by the first end of the cylinder.

2. The medical system of claim 1, further comprising a second rotor arranged within the working channel between the first rotor and a proximal end of the endoscope.

3. The medical system of claim 1, wherein the first rotor is arranged to modulate air pressure within the working channel during rotation of the first rotor.

4. The medical system of claim 3, wherein:
   rotation of the first rotor in a first rotary direction creates vacuum pressure in the working channel; and
   rotation of the first rotor in a second rotary direction creates plenum pressure in the working channel.

5. The medical system of claim 1, further comprising a flexible rotary shaft arranged within the working channel of the endoscope, a first end of the flexible rotary shaft couplable with the first rotor at a second end of the first rotor.

6. The medical system of claim 5, wherein the flexible rotary shaft is couplable to a drive at a second end of the flexible rotary shaft.

7. The medical system of claim 6, further comprising an actuator, configured to move the first rotor axially, the actuator movable between:
- a first actuator position that locates the first rotor at the first rotor position; and
- a second actuator position that locates the first rotor is moved to the second rotor position in which the drive is concurrently actuated.

8. The medical system of claim 1, wherein the first end of the cylinder includes a plurality of serrations.

9. The medical system of claim 1, wherein the first end of the cylinder includes a plurality of jaws.

10. The medical system of claim 1, further comprising a remote suction valve couplable to a proximal end of the endoscope and configured to provide suction to the working channel.

11. The medical system of claim 1, further including the endoscope including the endoscope probe shaft having the distal end and the endoscope working channel extending through the probe shaft.

12. A medical device comprising:
- an endoscope including an endoscope probe shaft having a distal end and a working channel extending through the probe shaft;
- a cylinder configured for use at a distal end of the probe shaft, the cylinder including a cylinder channel extending from a first end of the cylinder to a second end of the cylinder, wherein the first end of the cylinder defines a distal-most aperture of the working channel; and
- a first rotor arranged within the working channel of the probe shaft at the distal end of the probe shaft, the first rotor selectively moveable axially, within the cylinder, between:
  - a first rotor position wherein a first end of the first rotor extends through the cylinder channel toward the distal-most aperture defined by the first end of the cylinder, such that a distal end of the first rotor extends at least flush with the distal-most aperture; and
  - a second rotor position wherein the first end of the first rotor extends through the cylinder channel recessed from the first end of the cylinder.

13. The medical device of claim 12, further comprising a second rotor arranged within the working channel between the first rotor and a proximal end of the probe shaft.

14. The medical device of claim 12, wherein the first rotor is arranged to modulate air pressure within the working channel during rotation of the first rotor.

15. The medical device of claim 14, wherein:
- rotation of the first rotor in a first rotary direction creates vacuum pressure in the working channel; and
- rotation of the first rotor in a second rotary direction creates plenum pressure in the working channel.

16. The medical device of claim 12, further comprising a cable arranged within the working channel of the probe shaft, a first end of the cable couplable with the first rotor at a second end of the first rotor.

17. A method for performing endoscopy using an endoscope probe shaft including a working channel, the method comprising:
- providing or obtaining a cylinder configured for use at a distal end of the probe shaft, the cylinder including a cylinder channel extending therethrough, wherein the distal end of the cylinder defines a distal-most aperture of the working channel;
- moving a rotor between:
  - a first rotor position wherein the rotor extends through the cylinder channel toward the distal-most aperture defined by a distal end of the cylinder, such that a distal end of the first rotor extends at least flush with the distal-most aperture; and
  - a second rotor position wherein the rotor extends through the cylinder channel recessed from the distal end of the cylinder;
- selectively rotating, via a drive, the rotor to modulate an air pressure within the working channel;
- fragmenting foreign bodies within the working channel; and
- applying suction to the working channel to draw the fragmented foreign bodies out of the working channel.

18. The method of claim 17, wherein selectively rotating comprises:
- rotating the rotor in a first rotary direction to create vacuum pressure in the working channel; and
- rotating the rotor in a second rotary direction to create plenum pressure in the working channel.

19. The method of claim 18, further comprising selectively operating an actuator including:
- selecting a first actuator position that locates the rotor at the first rotor position; and
- selecting a second actuator position that locates the rotor is moved to the second rotor position in which the drive is concurrently actuated.

* * * * *